2,982,674
PROCESS TO RENDER WATER-REPELLENT BUILDING MATERIALS

Abraam Gancberg, Forest-Brussels, Belgium, assignor to Union Chimique Belge, S.A., Brussels, Belgium, a corporation of Belgium No Drawing. Filed Nov. 30, 1956, Ser. No. 625,255

Claims priority, application Belgium Dec. 23, 1955

1 Claim. (Cl. 117—123)

Various processes have been proposed for waterproofing building materials. In some cases, the results obtained are incomplete, since it has been observed that the presence of free lime results in a fairly rapid destruction of some water-repellent products, such as organosilicic derivatives, and deteriorates their waterproofing effect.

In a patent application Serial No. 621,519, filed November 13, 1956, I have claimed a two-step process for waterproofing building materials. The first step of this process consists in applying a substance which prevents the decomposition of the organosilicon compounds by the free lime present in the building materials. In the second step, an organopolysiloxane is applied.

The present invention relates to a one-step process for waterproofing building materials. This process consists in treating the building materials by means of an emulsion of organosilicon compounds, to which other substances may be added. This process as compared with the process claimed in the above application offers the advantage of carrying out the waterproofing more readily in a single step.

The waterproofing emulsion containing an organosilicon compound is an aqueous emulsion of an organic solution of a silicone. The organic radicals attached to the silicon are: an alkyl radical containing from 1 to 6 carbon atoms, a phenyl or a mixture of radicals such as methyl-phenyl, ethyl-phenyl, propyl-phenyl radicals or the like.

The other substances added to the waterproofing emulsion and which protect from deterioration by free lime the waterproof coating provided by the silicones are selected in the group consisting of chlorinated rubber and acrylic resins. These acrylic resins are polymers or copolymers of alkyl or vinyl acrylates or methacrylates, said alkyl radical containing from 1 to 6 carbon atoms.

The organo-silicon compounds and the protecting substances selected from the group consisting of chlorinated rubber and acrylic resins in the water-proofing emulsion should be in such proportions, and the emulsion should be applied to the building materials in such amounts that about 0.5 to 20 grams of the silicones and from 0.5 to about 20 grams of the protecting substances are applied per square meter surface of the building material.

Two methods of determining the waterproofing effect on building materials are used:

(1) The "pearling effect," that is to say, the formation of drops on the surface of the treated materials, which is determined qualitatively, and (2) The determination of the water absorption after sprinkling by means of a water jet, which may be determined quantitatively.

The waterproofing results obtained in accordance with the invention were very good and persisted at room temperature during several months. An artificial ageing test was adopted in order to obtain a better estimation of the effect of the various mixtures used. Said test consists in heating waterproofed flat sheets in an autoclave for two hours or more at 110° C. in a steam-saturated atmosphere.

The quantity of emulsion applied is always 50 g. per square meter. The concentration of the silicone in the emulsion ready for use is 4% and that of the other ingredients, namely, the above-described protective substance selected from the group consisting of chlorinated rubber and acrylic resins, may vary from 2% to 2.8%. In some tests, the concentrations of the products applied were varied within wider limits.

The following examples relate to the treatment of asbestos-cement flat sheets. It will be obvious that the process according to the invention is applicable to any building materials, which contain free lime or other substances able to destroy the organopolysiloxanes.

The emulsions used in the examples are:

Emulsion A:

| | P. |
|---|---|
| Methyl-phenyl silicone Me:Ph=60:40; (Me+Ph):Si=1.6 | 15 |
| Toluene | 7.5 |
| Xylene | 7.5 |
| Stearic acid | 2.5 |
| Morpholine | 1.1 |
| Carboxymethyl cellulose | 0.03 |
| Sodium dioctylsulphosuccinate | 0.7 |
| Water | 65.67 |

Emulsion B:

| | |
|---|---|
| Phenyl silicone, Ph:Si=1.6 | 15 |
| Toluene | 7.5 |
| Xylene | 7.5 |
| Oleic acid | 2.5 |
| Morpholine | 1.1 |
| Sodium dioctylsulphosuccinate | 0.7 |
| Carboxymethyl cellulose | 0.035 |
| Water | 65.67 |

Emulsion C:

| | |
|---|---|
| Ethyl silicone, Et:Si=1.4 | 15 |
| Toluene | 7.5 |
| Xylene | 7.5 |
| Stearic acid | 2.5 |
| Morpholine | 1.1 |
| Carboxymethyl cellulose | 0.35 |
| Sodium dioctylsulphosuccinate | 0.7 |
| Water | 65.5 |

*Example 1.—Black asbestos-cement flat sheets*

About 2 g. of silicone per square meter is brushed on. After air drying, the samples are first subjected to storage in stacks for 15 days in a confined atmosphere, and thereafter to an "ageing" for two hours in an autoclave at 110° C. in a moist atmosphere. The results obtained were as follows.

The "pearling effect" after storage is good except for the control sample. For the water absorption, the results were expressed in grammes related to flat sheets of 20 x 20 cm.

| | G. |
|---|---|
| Unaged control sample | 8.3 |
| Emulsion A | 5.5 |
| Emulsion B+acrylic resin emulsion | 2.2 |

*Example 2.—Gray asbestos-cement flat sheets (very porous)*

The tests were carried out under the same conditions as in Example 1. The "pearling effect" was good after storage except for the flat sheets used as control samples. For the water absorption, the results were:

|   | G. |
|---|---|
| Control sample | 25.6 |
| Emulsion A | 11.8 |
| Emulsion A+chlorinated rubber emulsion | 3.6 |
| Emulsion A+acrylic resin emulsion (1.2 g./m.$^2$) | 3.2 |
| Emulsion A+acrylic resin emulsion (4 g./m.$^2$) | 2.6 |

*Example 3.—Gray asbestos-cement flat sheets*

The tests were carried out under the same conditions as in the preceding examples, the asbestos-cement flat sheets being different.

|   | G. |
|---|---|
| Control sample | 16.8 |
| Emulsion A | 11.2 |
| Emulsion A+acrylic resin emulsion | 2.8 |

I claim:

A one-step process for rendering water-repellent building materials containing free lime which comprises treating said materials with a waterproofing aqueous emulsion of both (a) an organo-silicon compound selected from the group consisting of alkyl-silicones, phenyl-silicones and alkyl-phenyl silicones, the alkyl radical containing from 1 to 6 carbon atoms, and (b) a substance protecting from deterioration by free lime the waterproof coating provided by the silicones selected from the group consisting of chlorinated rubber and acrylic resins, said emulsion containing said organo-silicon compound and said protecting substance in such proportions, and said materials being treated with such amounts of said emulsion, that from about 0.5 to 20 grams of said organo-silicon compound and from about 0.5 to 20 grams of said protecting substance are applied per square meter surface of said materials.

References Cited in the file of this patent

UNITED STATES PATENTS

| 2,344,579 | Whitesides | Mar. 21, 1944 |
| 2,482,307 | Walker et al. | Sept. 20, 1949 |
| 2,491,487 | Faulwetter | Dec. 20, 1949 |
| 2,574,168 | Brick | Nov. 6, 1951 |
| 2,588,828 | Greiner | Mar. 11, 1952 |
| 2,635,060 | Cheronis et al. | Apr. 14, 1953 |
| 2,679,491 | Kennedy et al. | May 25, 1954 |
| 2,679,495 | Bunnell | May 25, 1954 |
| 2,726,176 | Hatcher et al. | Dec. 6, 1955 |
| 2,757,152 | Solomon | July 31, 1956 |
| 2,757,159 | Hormats | July 31, 1956 |
| 2,778,283 | Bettoli | Jan. 22, 1957 |
| 2,794,752 | Schmidt | June 4, 1957 |

FOREIGN PATENTS

| 595,565 | Great Britain | Dec. 9, 1947 |
| 736,561 | Great Britain | Sept. 7, 1955 |